(12) United States Patent
Ishikawa et al.

(10) Patent No.: US 6,440,034 B1
(45) Date of Patent: Aug. 27, 2002

(54) TOROIDAL-TYPE CONTINUOUSLY VARIABLE TRANSMISSION

(75) Inventors: Kouji Ishikawa; Nobuo Goto; Takashi Imanishi, all of Kanagawa (JP)

(73) Assignee: NSK, Ltd., Tokyo (JP)

(*) Notice: Subject to any disclaimer, the term of this patent is extended or adjusted under 35 U.S.C. 154(b) by 0 days.

(21) Appl. No.: 09/667,772

(22) Filed: Sep. 22, 2000

(30) Foreign Application Priority Data

Oct. 19, 1999 (JP) ............................................. 11-296190

(51) Int. Cl.⁷ ............................................. F16H 15/38
(52) U.S. Cl. ............................................. 476/46; 476/40
(58) Field of Search ............................... 476/40, 42, 46

(56) References Cited

U.S. PATENT DOCUMENTS 6,152,850 A * 11/2000 Inoue et al. .................... 476/44

FOREIGN PATENT DOCUMENTS

| JP | 62-71465 | 5/1987 | ............ F16H/15/38 |
| JP | 1-173552 | 12/1989 | ............ F16H/15/38 |
| JP | 11-22800 | 1/1999 | ............ F16H/15/38 |
| JP | 11-153203 | 6/1999 | ............ F16H/15/38 |
| JP | 11-210854 | 8/1999 | ............ F16H/15/38 |

OTHER PUBLICATIONS

Patent Abstracts of Japan 11153203 Jun. 8, 1999.
Patent Abstracts of Japan 11210854 Aug. 3, 1999.
Patent Abstracts of Japan 11022800 Jan. 26, 1999.

* cited by examiner

Primary Examiner—Allan D. Herrmann
(74) Attorney, Agent, or Firm—Sughrue Mion, PLLC

(57) ABSTRACT

In the toroidal-type continuously variable transmission, the radial clearance of a second radial needle roller bearing 30 for supporting the power roller 8 on the periphery of the pivot shaft portion 26 of the displacement shaft 7 is set larger than the radial clearance of a first radial needle roller bearing 27 for supporting a support shaft portion 25 on a trunnion 6. By increasing the radial clearance of the second radial needle roller bearing 30 in this manner, an increase in the surface pressures in the contact portions between the rolling surfaces of needle rollers 32, 32 and the inner peripheral surface of the power roller 8 and the outer peripheral surface of the pivot shaft portion 26 can be restricted, thereby enhancing the durability of the toroidal-type continuously variable transmission. Also, by reducing the radial clearance of the first radial needle roller bearing 27, the inclination of the displacement shaft 7 is minimized, thereby stabilizing the rotation speed change operation thereof.

3 Claims, 7 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission for use as a transmission unit for a car transmission or as a transmission for various kinds of industrial machines and, in particular, to such toroidal-type continuously variable transmission which is improved in the durability thereof as well as in the stability of the speed change operation thereof.

2. Description of the Related Art

Conventionally, it has been studied to use such a toroidal-type continuously variable transmission as shown in FIGS. 4 and 5 as a transmission unit for a car transmission. In the conventional toroidal-type continuously variable transmission, for example, as disclosed in JP-A-62-71465U, an input side disk 2 is supported concentrically with an input shaft 1, while an output side disk 4 is fixed to the end portion of an output shaft 3 which is disposed concentrically with the input shaft 1. In the interior portion of a casing in which the toroidal-type continuously variable transmission is stored, there are disposed trunnions 6, 6 which can be respectively swung about their associated pair of pivot shafts 5, 5 which are respectively set at positions along an imaginary plane that is perpendicular to an imaginary line connecting the respective axes of the input and output shafts 1 and 3, and distanced from the intersection of the imaginary plane and imaginary line, as shown in FIG. 4. This physical relation is hereinafter referred to as "torsional relation (torsional position)".

That is, in the case of the trunnions 6, 6, the pivot shafts 5, 5 are arranged on the outer surfaces of the two end portions of the respective trunnions 6, 6 in such a manner that the pivot shafts 5, 5 are concentric with each other. The base end portions of displacement shafts 7, 7 are supported on the respective middle portions of the trunnions 6, 6 and, by swinging the trunnions 6, 6 about their respective pivot shafts 5, 5, the inclination angles of the displacement shafts 7, 7 can be freely adjusted. On the peripheries of the displacement shafts 7, 7 respectively supported on the trunnions 6, 6, there are rotatably supported a plurality of power rollers 8, 8. And, the plurality of power rollers 8, 8 are respectively held by and between the mutually opposing inner surfaces 2a, 4a of the input side and output side disks 2, 4. The mutually opposing inner surfaces 2a, 4a each has a cross section formed as a concave surface which can be obtained by rotating an arc with the pivot shaft 5 as the center thereof. On the other hand, the power rollers 8, 8 respectively have peripheral surfaces 8a, 8a each of which is formed as a spherically convex surface. And, the peripheral surfaces 8a, 8a of the power rollers 8, 8 are respectively contacted with the inner surfaces 2a, 4a.

Between the input shaft 1 and the input side disk 2, there is interposed a pressure device 9 of a loading cam type. Thus, the input side disk 2 can be elastically pushed toward the output side disk 4 by the pressure device 9. The pressure device 9 comprises a cam plate 10 rotatable together with the input shaft 1, and a plurality of rollers 12, 12 (for example, four rollers) which are respectively held by a retainer 11. On one side surface (in FIGS. 4 and 5, the left side surface) of the cam plate 10, there is formed a drive-side cam surface 13 which comprises a curved surface extending in the circumferential direction of the cam plate 10. Further, on the outer surface (in FIGS. 4 and 5, the right side surface) of the input side disk 2 there is formed a driven-side cam surface 14 which is similar in shape to the drive-side cam surface 13. And the plurality of rollers 12, 12 are supported in such a manner that they can be freely rotated about their respective axes extending in the radial direction with respect to the center of the input shaft 1.

When the above-structured toroidal-type continuously variable transmission is in operation, in case where the cam plate 10 is rotated due to the rotation of the input shaft 1, the drive-side cam surface 13 of the cam plate 10 presses the plurality of rollers 12, 12 against the driven-side cam surface 14 formed on the outer surface of the input side disk 2. As a result of this, the input side disk 2 is pressed against the plurality of power rollers 8, 8 and, at the same time, the drive-side and driven-side cam surfaces 13, 14 and the plurality of rollers 12, 12 are pressed against each other, thereby causing the input side disk 2 to be rotated. And, the rotation of the input side disk 2 is transmitted to the output side disk 4 through the plurality of power rollers 8, 8, with the result that the output shaft 3 fixed to the output side disk 4 can be rotated.

Of cases in which the rotation speed ratio (transmission ratio) between the input shaft 1 and output shaft 3 is to be changed, at first, when decreasing the rotation speed ratio between the input shaft 1 and output shaft 3, the trunnions 6, 6 may be swung about their respective pivot shafts 5, 5 in a given direction. And, the displacement shafts 7, 7 are inclined in such a manner that the peripheral surfaces 8a, 8a of the power rollers 8, 8, as shown in FIG. 4, can be respectively contacted with the near-center portion of the inner surface 2a of the input side disk 2 and with the near-outer-periphery portion of the inner surface 4a of the output side disk 4. On the other hand, when increasing the rotation speed ratio, the trunnions 6, 6 may be swung about their respective pivot shafts 5, 5, in the opposite direction. And, the displacement shafts 7, 7 are inclined in such a manner that the peripheral surfaces 8a, 8a of the power rollers 8, 8, as shown in FIG. 5, can be respectively contacted with the near-outer-periphery portion of the inner surface 2a of the input side disk 2 and with the near-center portion of the inner surface 4a of the output side disk 4. In case where the inclination angles of the displacement shafts 7, 7 are set in the middle of the inclination angles in FIGS. 4 and 5, there can be obtained a middle rotation speed ratio between the input shaft 1 and output shaft 3.

Now, FIGS. 6 and 7 show an example of a more specific structure of a toroidal-type continuously variable transmission which is disclosed in JP-A-1-173552U. In this structure, an input side disk 2 and an output side disk 4 are rotatably supported on the peripheries of a circular-pipe-shaped input shaft 15 through their respective needle roller bearings 16, 16. Also, a cam plate 10 is spline engaged with the outer peripheral surface of the end portion (in FIG. 6, the left end portion) of the input shaft 15, while a collar portion 17 prevents the cam plate 10 from moving in a direction in which it parts away from the input side disk 2. And, the cam plate 10 and rollers 12, 12 cooperate together in forming a pressure device 9 of a loading came type which, in accordance with the rotation of the input shaft 15, rotates the input side disk 2 toward the output side disk 4 while pressing the input side disk 2. And, an output gear 18 is connected to the output side disk 4 through keys 19, 19, whereby the output side disk 4 and output gear 18 can be rotated in synchronism with each other.

In the pair of trunnions 6, 6, the two end portions of the respective trunnions 6, 6 are supported on a pair of support plates 20, 20 in such a manner that they can be swung as well as can be shifted in the axial direction thereof (that is, in FIG. 6, in the front and back direction; and, in FIG. 7, in the right and left direction). That is, between the outer peripheral surfaces of pivot shafts 5, 5 fixedly secured to the two end portions of the respective trunnions 6, 6 and the inner peripheral surfaces of circular holes 21, 21 respectively formed in the two end portions of the support plates 20, 20, there are interposed radial needle roller bearings 22, 22. The outer peripheral surfaces of outer races 23, 23 respectively forming part of the radial needle roller bearings 22, 22 are formed as spherically convex surfaces and are fitted into the circular holes 21, 21 in such a manner that they can be swung as well as can be shifted in the axial direction thereof.

Also, in the middle portions of the trunnions 6, 6 which are supported between the pair of support plates 20, 20 in such a manner that they can be swung as well as can be shifted in the axial direction thereof, there are formed another circular holes 24, 24, respectively; and, on the circular holes 24, 24 portions of the trunnions 6, 6, there are supported displacement shafts 7, 7, respectively. These displacement shafts 7, 7 respectively include support shaft portions 25, 25 and pivot shaft portions 26, 26 which are parallel to each other but are shifted form each other. Of these shaft portions, the support shaft portions 25, 25 are rotatably supported by first radial needle roller bearings 27, 27 which are disposed inside the circular holes 24, 24 and include raceways formed by cutting.

Also, the power rollers 8, 8 are rotatably supported on the peripheries of the pivot shaft portions 26, 26 by second radial needle roller bearings 30, 30. By the way, the second radial needle roller bearings 30, 30 need a high operating speed because they have to support the power rollers 8 which are rotating at a high speed. For this reason, as the second radial needle roller bearings 30, 30, there are used radial needle roller bearings each including a retainer 31 which can prevent the rolling surfaces of circumferentially mutually adjoining needle rollers 32, 32 from rubbing against each other.

By the way, the pair of displacement shafts 7, 7 are disposed at 180° opposite side positions with respect to the input shaft 15. Also, the shifting directions of the pivot shaft portions 26, 26 of these displacement shafts 7, 7 with respect to the support shaft portions 25, 25 are the same directions (in FIG. 7, in the reversed right and left directions) with respect to the rotation directions of the input side and output side disks 2, 4. Also, the above shifting directions are set so as to be substantially perpendicular to a direction in which the input shaft 15 is arranged. Therefore, the power rollers 8, 8 are supported in such a manner that they can be shifted to a slight degree in the arranged direction of the input shaft 15. As a result of this, even when the power rollers 8, 8 tend to shift in the axial direction of the input shaft 15 (that is, in FIG. 6, in the right and left direction; and, in FIG. 7, in the front and back direction) due to the elastic deformation of the component members of the present toroidal-type continuously variable transmission caused by large loads applied to the component members during the transmission of the rotation force, such shifting movements of the power rollers 8, 8 can be absorbed without applying an unreasonable force to the respective component members.

Also, between the outer surfaces of the power rollers 8, 8 and the inner surfaces of the middle portions of the trunnions 6, 6, there are disposed thrust ball bearings 33, 33 and thrust needle roller bearings 34, 34 in series to each other with respect to the acting direction of the thrust load (in FIGS. 6 and 7, in the vertical direction) sequentially in order starting from the outer surfaces of the power rollers 8, 8. Of these bearings, the thrust ball bearings 33, 33 are structured such that, while supporting thrust-direction loads applied to the power rollers 8, 8, they allow the power rollers 8, 8 to rotate. Also, the thrust needle roller bearings 34, 34, while supporting thrust loads applied to outer races 35, 35 respectively forming part of the thrust ball bearings 33, 33 from the power rollers 8, 8, allow the pivot shaft portions 26, 26 and the outer races 35, 35 to swing about the support shaft portions 25, 25.

Further, to the one-end portions.(in FIG. 7, the left end portions) of the trunnions 6, 6, there are connected drive rods 36, 36, respectively; and, on the outer peripheral surfaces of the middle portions of the drive rods 36, 36, there are fixedly disposed drive pistons 37, 37, respectively. And, these drive pistons 37, 37 are fitted into their associated drive cylinders 38, 38 in an oil-tight manner.

In the case of the above-structured toroidal-type continuously variable transmission, the rotation of the input shaft 15 is transmitted through the pressure device 9 to the input side disk 2. And, the rotation of the input disk 2 is transmitted through the pair of power rollers 8, 8 to the output disk 4; and, further, the rotation of the output disk 4 is taken out from the output gear 18. To change a rotation speed ratio between the input shaft 15 and output gear 18, the pair of drive pistons 37, 37 may be shifted in the mutually opposite directions. Due to the shifting movements of the drive pistons 37, 37, the pair of trunnions 6, 6 are shifted in the mutually opposite directions. Thus, for example, the power roller 8, which is disposed on the lower side in FIG. 7, is shifted to the right in FIG. 7; and, the power roller 8, which is disposed on the upper side in FIG. 7, is shifted to the left in FIG. 7. As a result of this, there is changed the direction of a tangential-direction force which is applied between the contact portions between the peripheral surfaces 8a, 8a of the power rollers 8, 8 and the inner surfaces 2a, 4a of the input side and output side disks 2, 4. Due to such direction change of the tangential-direction force, the trunnions 6, 6 are swung in the mutually opposite directions about their associated pivot shafts 5, 5 which are pivotally supported on the support plates 20, 20. As a result of this, as shown in FIGS. 4 and 5, the contact positions between the peripheral surfaces 8a, 8a of the power rollers 8, 8 and the inner surfaces 2a, 4a of the input side and output side disks 2, 4 are caused to change, which changes the rotation speed ratio between the input shaft 15 and output gear 18.

In the toroidal-type continuously variable transmission which is structured and operates in the above-mentioned manner, the radial clearance of the first radial needle roller bearings 27 supporting the support shaft portions 25 of the displacement shafts 7, 7 on the trunnions 6, 6, similarly to a general radial needle roller bearing of a solid type which is used to support a shaft having an outside diameter of the order of 20 mm, is set in the range of 20–42 $\mu$m. That is, the inside diameter of the outer race 28 (see FIG. 1 which will be discussed later) in a state where the outer race 28 is fitted to the circular hole 24 is set larger by a length of the order of 20–42 $\mu$m than the diameters of the minimum circumscribed circles of the needle rollers 29, 29 in a case where the needle rollers 29, 29 are disposed in such a manner that the rolling surfaces of the needle rollers 29, 29 are contacted with the outer peripheral surfaces of the support shaft portions 25.

On the other hand, the radial clearance of the second radial needle roller bearings 30 for supporting the power rollers 8, 8 on the pivot shaft portions 26 of the displacement shafts 7, 7, similarly to a general radial needle roller bearing with no raceway but with a retainer which is used to support a shaft having an outside diameter of the order of 20 mm, is set in the range of 7–21 μm. That is, the inside diameters of the power rollers 8, 8 are set larger by a length of the order of 7–21 μm than the diameters of the minimum circumscribed circles of the needle rollers 32, 32 in a case where the needle rollers 32, 32 are disposed in such a manner that the rolling surfaces of the needle rollers 32, 32 are contacted with the outer peripheral surfaces of the pivot shaft portions 26. At any rate, the radial clearances of the first radial needle roller bearings 27, 27 of a solid type are set larger than the radial clearances of the second radial needle roller bearings 30, 30 of a type that it does not include a raceway but includes a retainer.

However, in case where the radial clearances of the first radial needle roller bearings 27, 27 are set larger than the radial clearances of the second radial needle roller bearings 30, 30 in the above-mentioned manner, it is difficult to secure the durability of the toroidal-type continuously variable transmission and the stability of the rotation speed change operation thereof. The reason for this will be explained below in detail with reference to FIGS. 2 and 3.

That is, when the toroidal-type continuously variable transmission is in operation, the power rollers 8, as shown by the arrow mark A—A in FIG. 2, are respectively held at the two diameter-direction opposite positions strongly by the input side and output side disks 2 and 4 in accordance with the large thrust loads that are generated by the pressure device 9 (see FIGS. 4 and 5). Due to this, the shape of the section of each of the power rollers 8 is elastically deformed from its free state shape, that is, a circular shape shown by a solid line in FIG. 2 to an elliptical shape exaggeratedly shown by a chained line in FIG. 2. And, a clearance between the inner peripheral surface of each power roller 8 which is the outer race raceway of the second radial needle roller bearing 30 and the outer peripheral surface of the pivot shaft portion 26 of each displacement shaft 7 which is similarly the inner race raceway of the same second radial needle roller bearing 30 becomes small in the minor diameter portion of the above elliptical shape and becomes large in the major diameter portion thereof. As a result of this, the surface pressures of the contact portions between the rolling surfaces of the needle roller 32, 32 forming part of the second radial needle roller bearings 30 and the inner peripheral surfaces of the power rollers 8 and the outer peripheral surfaces of the pivotal shaft portions 26 are become large in the minor diameter portions of the above elliptical shapes. In the case of the conventional toroidal-type continuously variable transmission, since the radial clearances of the second radial needle roller bearings 30 are set small, that is, in the range of 7–21 μm, the surface pressures of the contact portions in the minor diameter portions of the elliptical shapes are high, which makes it difficult to secure the respective rolling fatigue lives of the inner peripheral surfaces of the power rollers 8 and the outer peripheral surfaces of the pivotal shaft portions 26.

Also, when the toroidal-type continuously variable transmission is in operation, a moment acting in a direction to incline the displacement shafts 7 with the support shaft portions 25 as the centers thereof is applied to the displacement shafts 7 from the power rollers 8. That is, when the toroidal-type continuously variable transmission is in operation, for example, a force F acting in the direction a shown in the arrow mark of FIG. 2 is applied to each of the power rollers 8 from the input side disk 2 (see FIGS. 4–6). Also, as a reaction of the transmission of the rotation force to the output disk 4 (see FIGS. 4–6) from the power rollers 8, there is applied a force F in the direction β shown in the arrow mark of FIG. 2 to each of the power rollers 8. As a result of this, a force 2F is applied from each of the power rollers 8 to each of the displacement shafts 7 as a moment acting in a direction to incline the displacement shaft 7 with the support shaft portion 25 as the center thereof. And, due to this moment, each of the displacement shafts 7 is inclined in such a manner as exaggeratedly shown in FIG. 3 and thus the power roller 8 disposed in the periphery of the pivot shaft portion 26 of the displacement shaft 7 is shifted slightly in the axial direction of the pivot shafts 5, 5.

For example, assuming that the radial clearance of the first radial needle roller bearing 27 for supporting the above support shaft portion 25 is 50 μm, the displacement shaft 7 is inclined about 0.16° and the power roller 8 is shifted by an amount of the order of 0.14 mm in the axial direction of the pivot shafts 5, 5. Even when the power roller 8 is shifted by an amount of the order of 0.1 mm in the axial direction of the pivot shafts 5, 5, the power roller 8 starts a rotation speed change operation. Therefore, in case where the displacement shaft 7 is inclined in the above-mentioned manner, this unfavorably provides a cause to unstabilize the rotation speed change operation.

SUMMARY OF THE INVENTION

The present invention aims at eliminating the above-mentioned drawbacks in the conventional toroidal-type continuously variable transmission. Accordingly, it is an object of the invention to provide a toroidal-type continuously variable transmission which not only can secure the respective rolling fatigue lives of the inner peripheral surfaces of the power rollers and the outer peripheral surfaces of the pivotal shaft portions to thereby be able to enhance the durability of the toroidal-type continuously variable transmission, but also can restrict the inclination of the displacement shafts to thereby be able to stabilize the rotation speed change operation.

In attaining the above object, according to a first aspect of the invention, there is provided a toroidal-type continuously variable transmission, comprising: a rotary shaft; first and second disks rotatably supported on the periphery of the rotary shaft respectively, each of the disks including an inner surface formed as a concave surface having an arc-shaped section; a plurality of trunnions respectively swingable about pivot shafts disposed at torsional positions with respect to the center axes of the first and second disks, each of the trunnions including a circular hole formed in the middle portion thereof in a direction perpendicular to the axial direction of the pivot shafts; a plurality of displacement shafts each including a support shaft portion and a pivot shaft portion, which extend in parallel to each other and are offset from each other; a first radial needle roller bearing disposed inside the circular hole of the trunnion, for rotatably supporting the support shaft portion; a plurality of power rollers respectively held by and between the first and second disks, each of the power rollers including a peripheral surface formed as a spherically convex surface; and, a second radial needle roller bearing disposed on the periphery of the pivot shaft portion, for rotatably supporting the power roller, wherein the radial clearance of the second radial needle roller bearing is set larger than the radial clearance of the first radial needle roller bearing.

According to a second aspect of the invention, in a toroidal-type continuously variable transmission as set forth in the first aspect of the invention, the outside diameters of the support shaft portion and pivot shaft portion forming the displacement shaft are set in the range of 15–25 mm, the radial clearance of the first radial needle roller bearing is set in the range of 9–31 μm, and the radial clearance of the second radial needle roller bearing is set in the range of 29–64 μm.

According to a third aspect of the invention, there is provided a toroidal-type continuously variable transmission, comprising: a rotary shaft; first and second disks rotatably supported on the periphery of the -rotary shaft respectively, each of the disks including an inner surface formed as a concave surface having an arc-shaped section, the inner surfaces of the disks being opposed to each other; a plurality of trunnions respectively swingable about pivot shafts disposed at torsional positions with respect to the center axes of the first and second disks, each of the trunnions including a circular hole formed in the middle portion thereof in a direction perpendicular to the axial direction of the pivot shafts; a plurality of displacement shafts respectively projecting from the inner surfaces of the trunnions, each of the displacement shafts including a support shaft portion and a pivot shaft portion, which extend in parallel to each other and are offset from each other; a first radial needle roller bearing disposed inside the circular hole of the trunnion, for rotatably supporting the support shaft portion; a plurality of power rollers respectively held by and between the first and second disks, each of the power rollers including a peripheral surface formed as a spherically convex surface, the peripheral surfaces of the power rollers being contacted with the inner surfaces of the first and second disks; a second radial needle roller bearing disposed on the periphery of the pivot shaft portion of the displacement shaft, for rotatably supporting the power roller; and, a plurality of thrust ball bearings respectively interposed between the power rollers and the inner surfaces of the trunnions, for supporting thrust-direction loads applied to the power rollers, wherein the radial clearance of the second radial needle roller bearing is set larger than the radial clearance of the first radial needle roller bearing.

In the above-structured toroidal-type continuously variable transmission according to the invention, based on a similar operation to the previously mentioned conventional toroidal-type continuously variable transmission, a rotation force is transmitted between the input side and output side disks (which respectively correspond to first and second disks in claims) and, by changing the inclination angles of the trunnions, a rotation speed ratio between the two disks is changed.

Especially, in the case of the toroidal-type continuously variable transmission according to the invention, by setting the radial clearances of the first radial needle roller bearings smaller those of the second radial needle roller bearings, the inclination of the displacement shafts can be prevented, thereby being able to stabilize the rotation speed change operation. Also, by setting the radial clearances of the second radial needle roller bearings than those of the first radial needle roller bearings, an increase in the surface pressures in the contact portions between the rolling surfaces of the needle rollers of the second radial needle roller bearings and the inner peripheral surfaces of the power rollers and the outer peripheral surface of the pivot shaft portions of the displacement shafts can be restricted, thereby being able to secure the rolling fatigue lives of the respective peripheral surfaces.

DETAILED DESCRIPTION OF THE PREFERRED EMBODIMENTS

Figure 1:
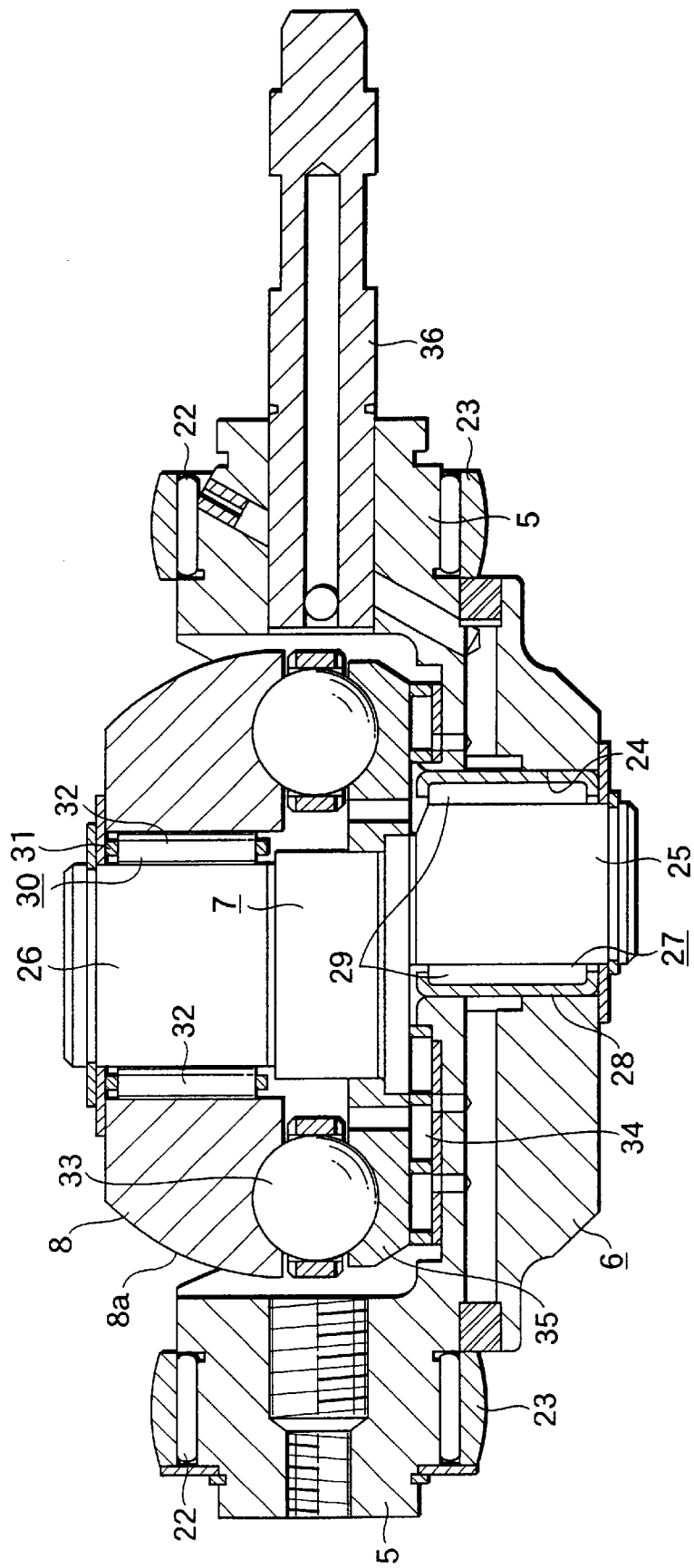
FIG. 1 is section view of an example of a mode for carrying out the invention, showing a state thereof in which a trunnion, a displacement shaft, a power roller and a drive rod are combined together through a plurality of rolling bearings including first and second radial needle roller bearings.

Now, FIG. 1 shows an example of a mode for carrying out the invention. By the way, the present invention is characterized in that, in order to enhance the durability of a toroidal-type continuously variable transmission as well as the stability of the rotation speed change operation thereof, the radial clearances C1, C2 of the first and second radial needle roller bearings 27, 30 are restricted. The structure and operation of the remaining portions of the invention are similar to those of the previously described conventional toroidal-type continuously variable transmission and, therefore, the illustration and description thereof are omitted or simplified here. Now, description will be given below of the characteristic portions of the invention and the portions thereof that have not been described previously.

In the middle portion of a trunnion 6 formed as an integral body by forging and cutting metal having large rigidity such as iron-system alloy, there is formed a circular hole 24 used to support a displacement shaft 7 which will be discussed below. And, a support shaft portion 25 forming part of the displacement shaft 7 is rotatably supported in the circular hole 24 by a first radial needle roller bearing 27. The first radial needle roller bearing 27 is a radial needle roller bearing of a solid type that it is composed of a cylindrical-shaped outer race 28 which is made by cutting and includes two inwardly facing flange-shaped collar portions respectively formed on the two end portions thereof, and needle rollers 29, 29 respectively stored on the inside diameter side of the outer race 28. Of these component members of the bearing, the outer race 28 is structured such that the outside diameter of the outer race 28 in the free state thereof is set equal to or slightly larger than the inside diameter of the circular hole 24. Therefore, the outer race 28 is fitted into the circular hole 24 with a fit allowance of 0 or with a slightly tight fit. In a state where the support shaft portion 25 is rotatably supported within the circular hole 24 by the thus-structured first radial needle roller bearing 27, a pivot shaft portion 26 forming part of the displacement shaft 7 is projected from the inner surface of the trunnion 6.

On the periphery of the pivot shaft portion 26 projected from the inner surface of the trunnion 6 in this manner, there is rotatably supported a power roller 8 by a second radial needle roller bearing 30. And, between the outer surface of the power roller 8 and the inner surface of the middle portion of the trunnion 6, there are interposed a thrust ball bearing 33 and a thrust needle roller bearing 34 in such a manner that they are arranged in series to each other with respect to the operation direction (in FIG. 1, in the vertical direction) of a thrust load. Due to this structure, the power roller 8 is supported on the inner surface portion of the trunnion 6 in such a manner that it can be rotated about the pivot shaft portion 26 as well as can be swung and shifted about the support shaft portion 25.

Especially, in the toroidal-type continuously variable transmission according to the invention, the radial clearance C2 of the second radial needle roller bearing 30 is set larger than the radial clearance C1 of the first radial needle roller bearing 27. Therefore, in case where the outside diameters of the support shaft portion 25 and pivot shaft portion 26 respectively forming the displacement shaft 7 are in the range of 15–25 mm, the radial clearance C1 of the first radial needle roller bearing 27 is set in the range of 9–31 $\mu$m, and the radial clearance C2 of the second radial needle roller bearing 30 is set in the range of 29–64 $\mu$m. By the way, in order to stabilize the rotation speed change operation of the toroidal-type continuously variable transmission, the upper limit value (31 $\mu$m) of the radial clearance C1 of the first radial needle roller bearing 27 is restricted such that the shifting movement of the power roller 8 in the axial direction of the pivot shaft 5, 5 can be controlled down to 0.1 mm or less. Also, the lower limit value (9 $\mu$m) of the radial clearance C1 of the first radial needle roller bearing 27 is restricted so as to be able to avoid troubles in the assembling operation thereof. On the other hand, the lower limit value (29 $\mu$m) of the radial clearance C2 of the second radial needle roller bearing 30 is restricted in such a manner that the surface pressures of the contact portions between the rolling surfaces of needle rollers 32, 32 forming part of the second radial needle roller bearing 30 and their mating raceway surfaces can be prevented from rising excessively. Also, the upper limit value (64 $\mu$m) thereof is restricted in such a manner that the installation portion of the second radial needle roller bearing 30 can be prevented from being rickety.

In the case of the above-structured toroidal-type continuously variable transmission according to the invention, by reducing the radial clearance C1 of the first radial needle roller bearing 27, the displacement shaft 7 can be prevented from inclining about the support shaft portion 25 thereof, thereby being able to stabilize the rotation speed change operation of the toroidal-type continuously variable transmission. That is, in the case where the radial clearance C1 of the first radial needle roller bearing 27 is reduced, the support shaft portion 25 is accordingly difficult to incline within the circular hole 24. Due to this, the inclination of the displacement shaft 7 can be restricted to a small amount, and thus the shift amount of the power roller 8, which is supported on the periphery of the pivot shaft portion 26 of the displacement shaft 7, in the axial direction of the pivot shafts 5, 5 can be restricted to a small amount, thereby being able to stabilize the above rotation speed change operation.

Figure 2:
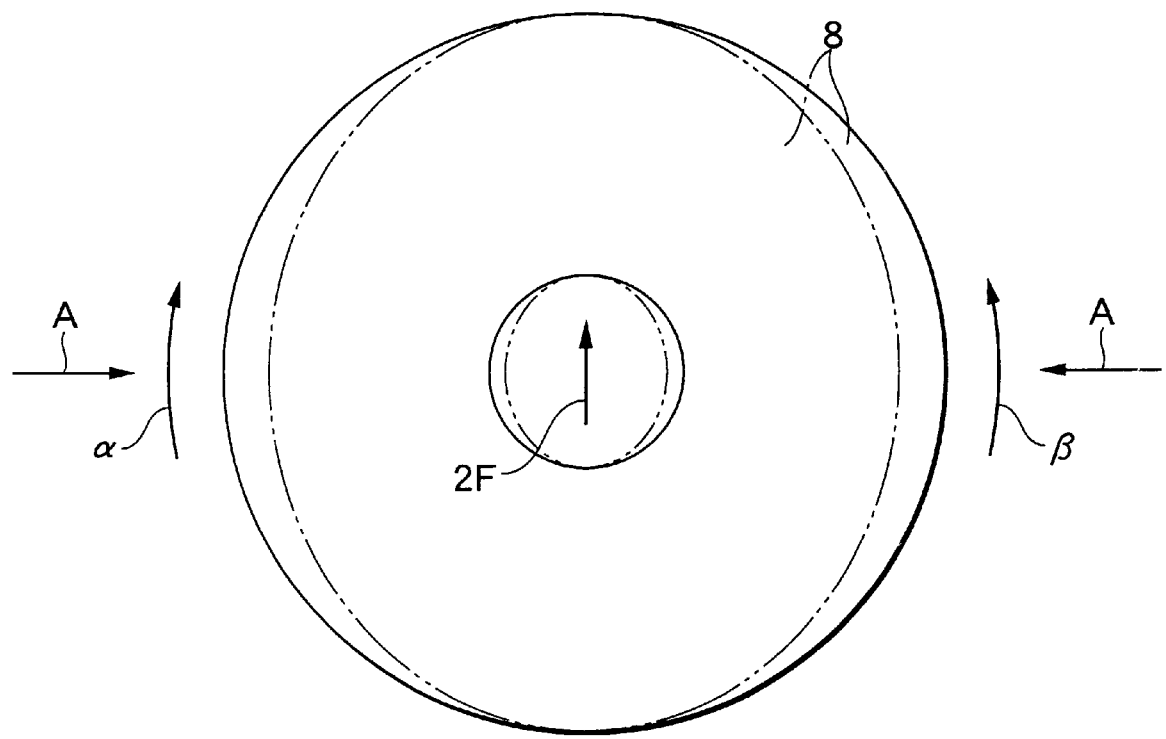
FIG. 2 is a schematic view exaggeratedly showing the elastic deformation of a power roller when a toroidal-type continuously variable transmission is in operation.
Figure 3:
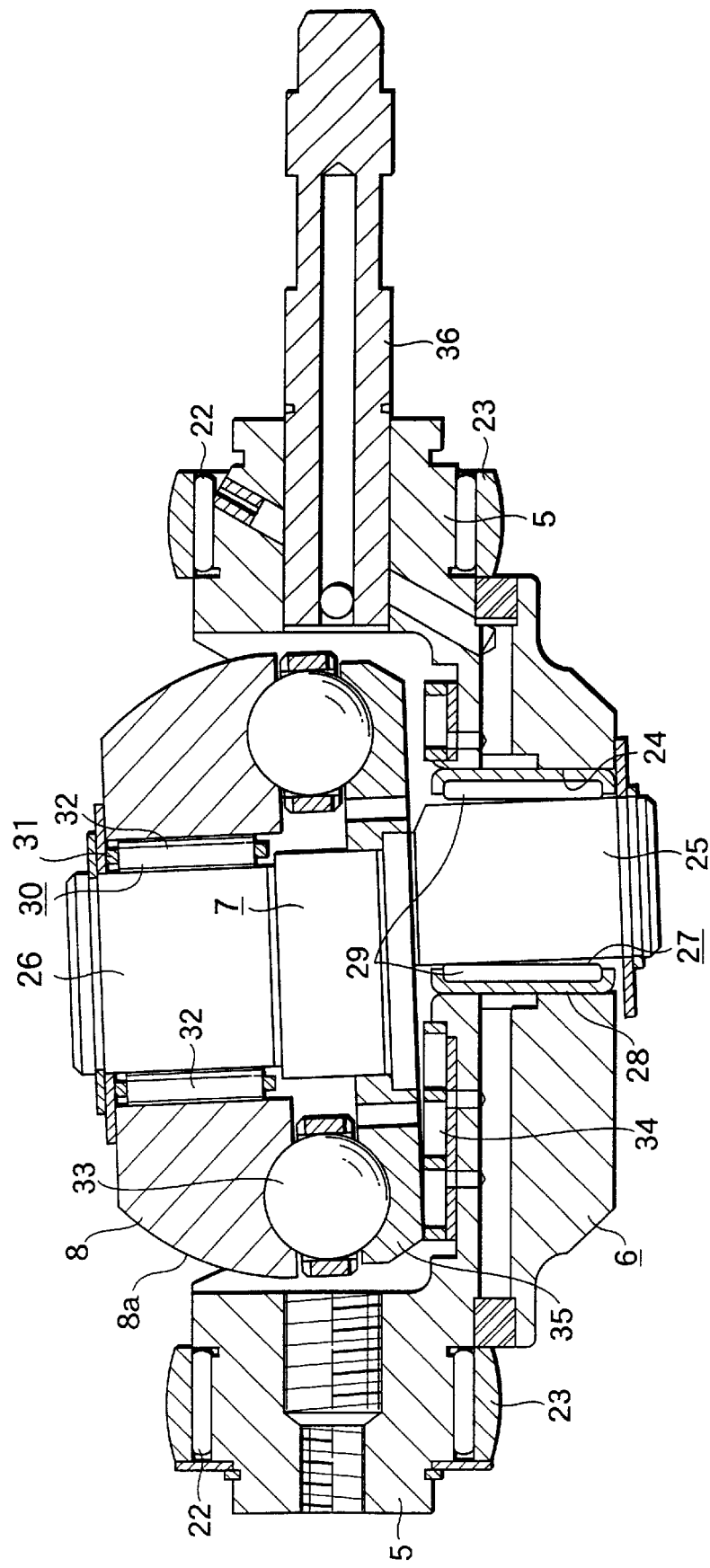
FIG. 3 is a section view similar to FIG. 1, exaggeratedly showing the inclination of a power roller when a toroidal-type continuously variable transmission is in operation.
Figure 4:
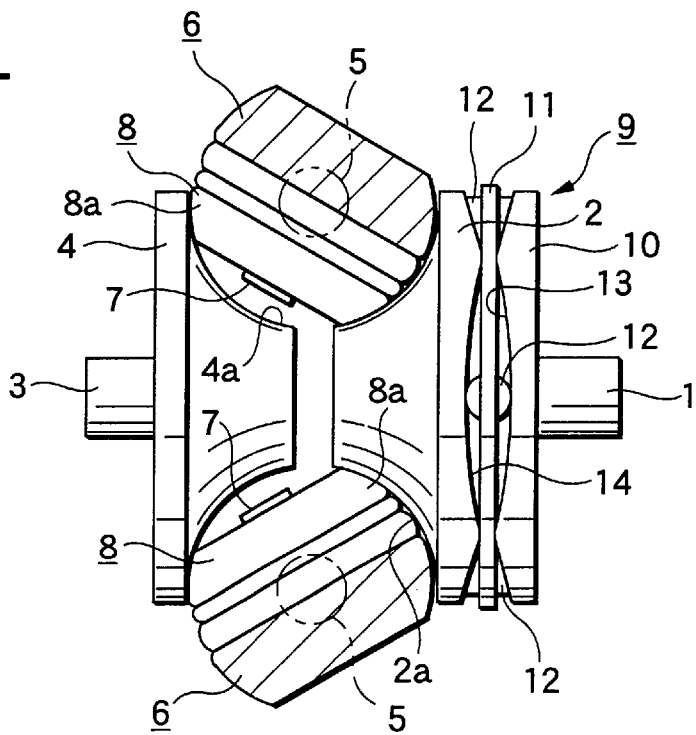
FIG. 4 is a side view of an example of the basic structure of a conventionally known toroidal-type continuously variable transmission, showing its maximum speed ratio decreasing state.
Figure 5:
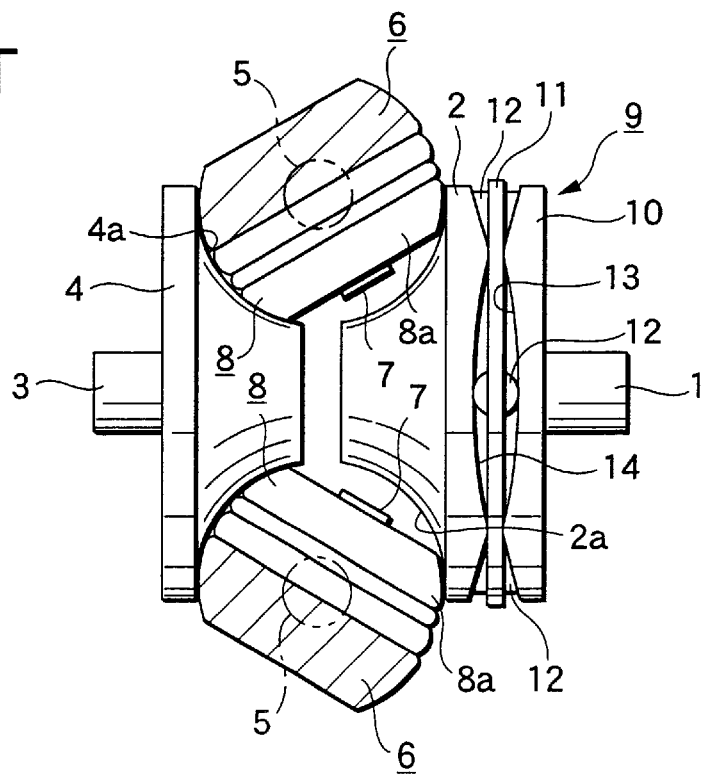
FIG. 5 is a side view similar to FIG. 4, showing its maximum speed ratio increasing state.
Figure 6:
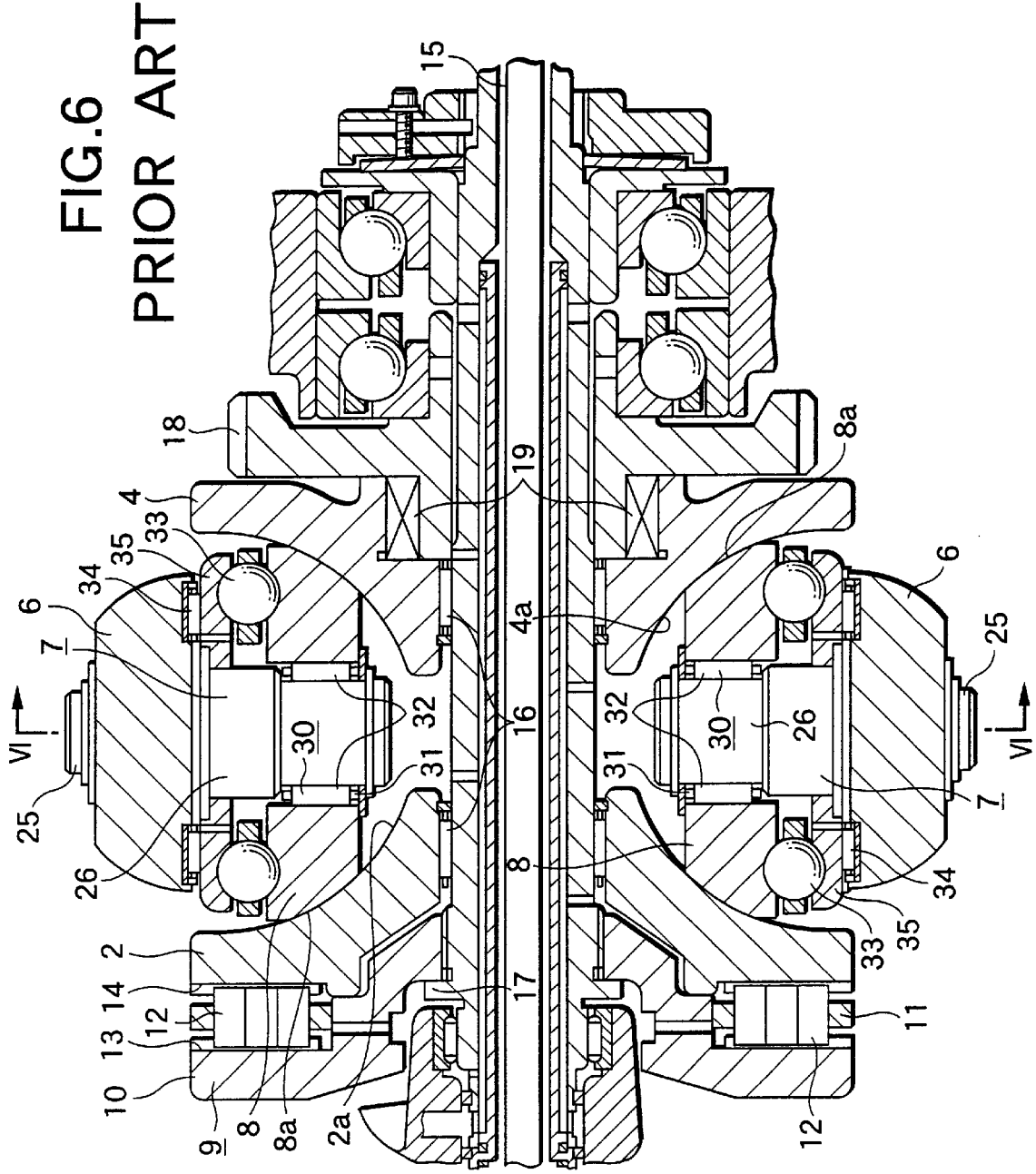
FIG. 6 is a section view of a specific structure of the conventional toroidal-type continuously variable transmission.
Figure 7:
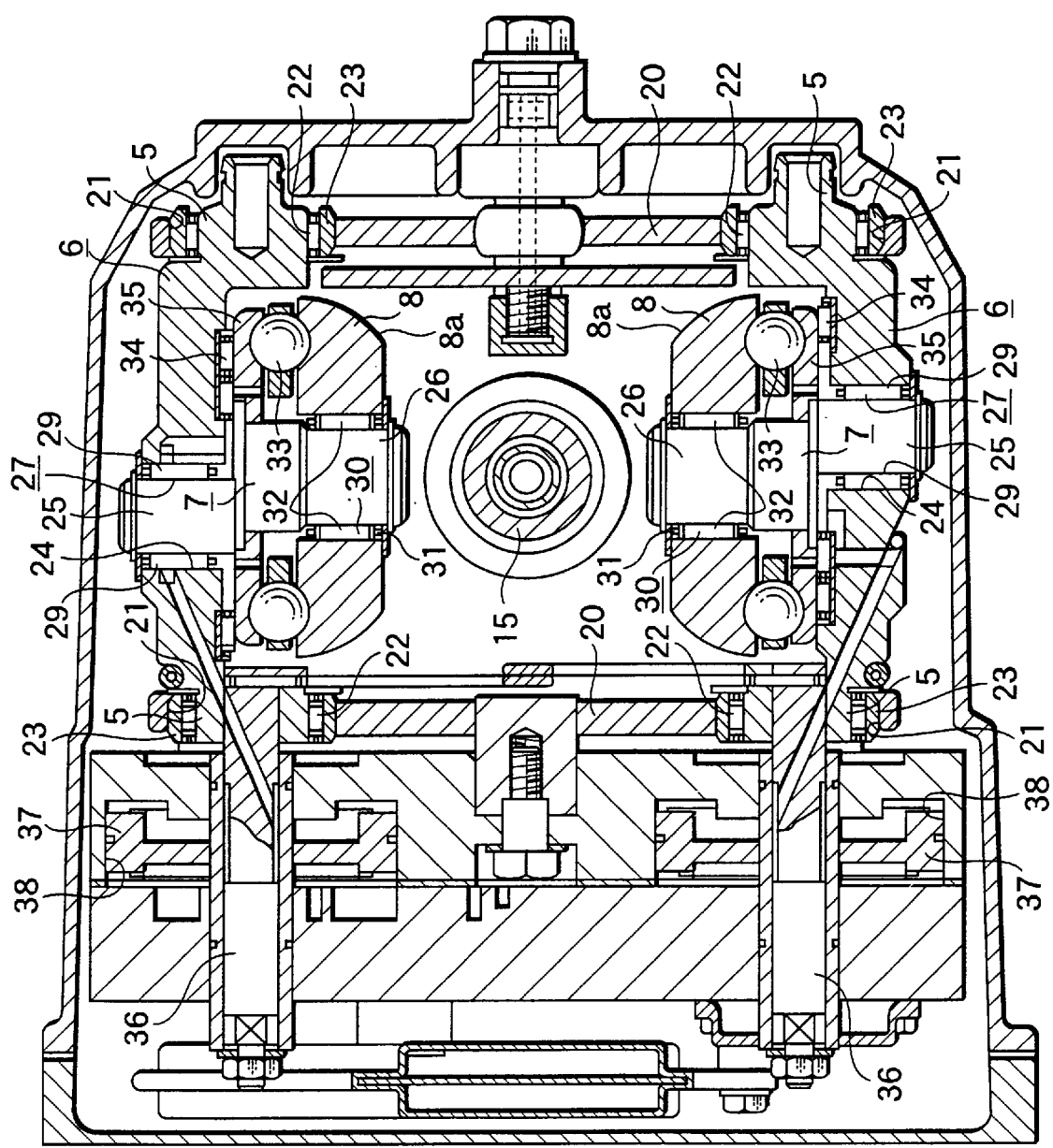
FIG. 7 is a section view taken along the line VI—VI shown in FIG. 6.
Figure 8:
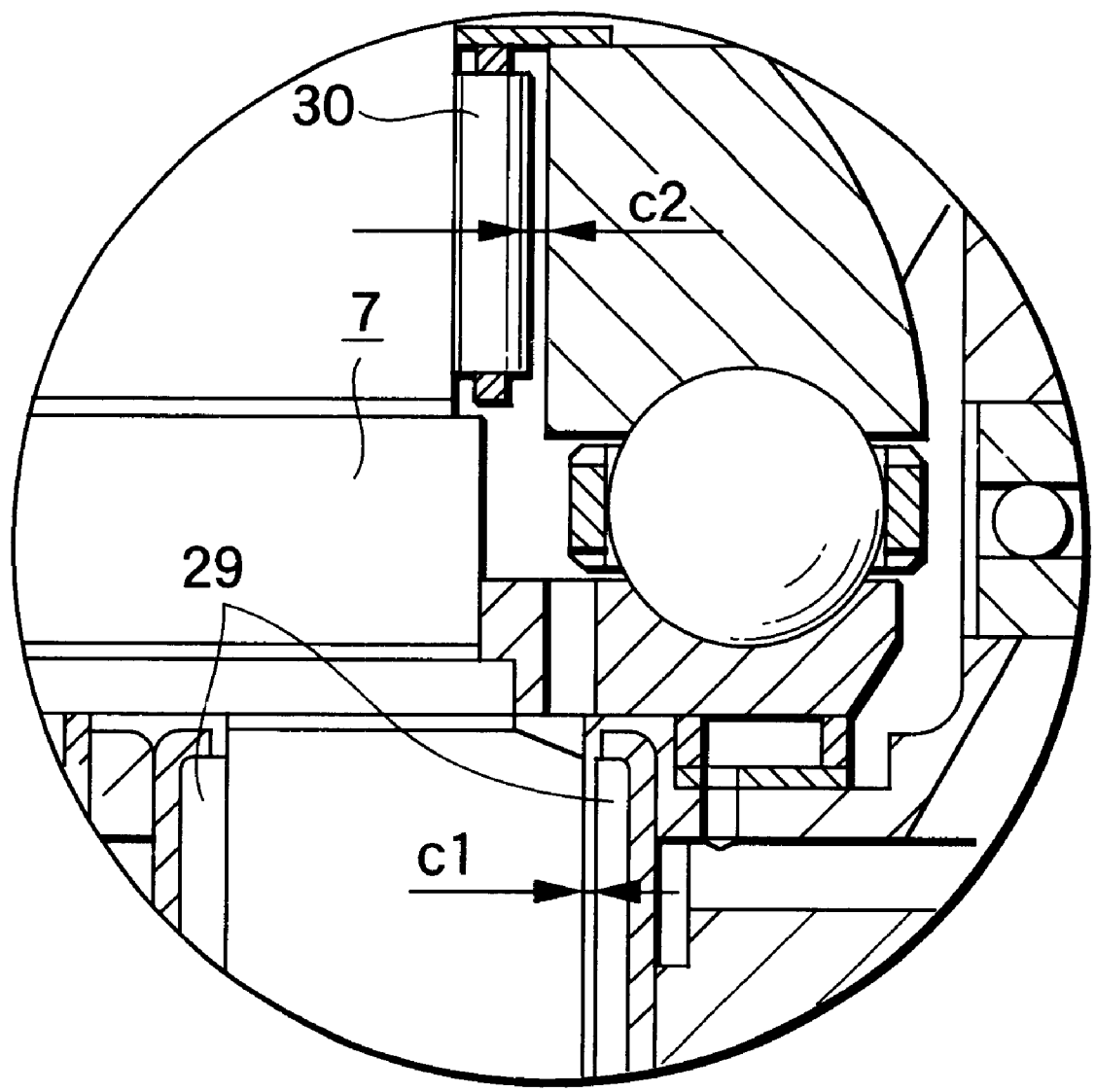
FIG. 8 is an enlarged view of a portion of FIG. 1 showing radial clearances of radial needle roller bearings.

Also, by increasing the radial clearance C2 of the second radial needle roller bearing 30, an increase in the surface pressures in the contact portions between the rolling surfaces of the needle rollers 32, 32 forming the second radial needle roller bearing 30 and the inner peripheral surfaces of the power roller 8 serving as an outer race raceway and the outer peripheral surface of the pivot shaft portion 26 serving as an inner race raceway can be restricted, thereby being able to secure the rolling fatigue lives of the respective peripheral surfaces. That is, since the radial clearance C2 of the second radial needle roller bearing 30 is set large, as shown in FIG. 2, even in the case where the power roller 8 is elastically deformed in such a manner that the shape of the section thereof is turned into an elliptical shape, there can be secured, in the minor diameter portion of the elliptical shape, a clearance between the inner peripheral surface of the power roller 8 and the outer peripheral surface of the pivot shaft portion 26. Due to this, as described above, an increase in the surface pressures of the contact portions thereof can be restricted, thereby being able to secure the rolling fatigue lives of the respective peripheral surfaces.

By the way, in a state where the power roller 8 is assembled to the inner surface portion of the trunnion 6 in such a manner as shown in FIG. 1 to thereby structure a power roller unit, a force acting in the diameter direction of the power roller 8 is applied to the power roller 8 and the amount of play of the thrust ball bearing 33 is measured. And, only the power roller unit whose play amount is 0 or equal to or less than a specified value is combined with other component members to thereby structure a toroidal-type continuously variable transmission. The reason for this is that, in case where the play amount of the thrust ball bearing 33 is large, the power roller 8 shifts in the axial direction of the pivot shafts 5, 5, which makes it impossible to achieve a stabilized rotation speed change operation.

Since the present invention is structured and operates in the above-mentioned manner, it can enhance not only the durability of a toroidal-type continuously variable transmission but also the stability of the rotation speed change operation thereof, which can contribute toward enhancing the practical use of a toroidal-type continuously variable transmission.

While only certain embodiments of the invention have been specifically described herein, it will apparent that numerous modifications may be made thereto without departing from the spirit and scope of the invention.

What is claimed is:

1. A toroidal-type continuously variable transmission, comprising:
   a rotary shaft;
   first and second disks rotatably supported on the periphery of said rotary shaft respectively, each of said disks including an inner surface formed as a concave surface having an arc-shaped section;
   a plurality of trunnions respectively swingable about pivot shafts disposed at torsional positions with respect to the center axes of said first and second disks, each of said trunnions including a circular hole formed in the middle portion thereof in a direction perpendicular to the axial direction of said pivot shafts;
   a plurality of displacement shafts each including a support shaft portion and a pivot shaft portion, which extend in parallel to each other and are offset from each other;
   a first radial needle roller bearing disposed inside said circular hole of said trunnion, for rotatably supporting said support shaft portion;
   a plurality of power rollers respectively held by and between said first and second disks, each of said power rollers including peripheral surface formed as a spherically convex surface; and,
   a second radial needle roller bearing disposed on the periphery of said pivot shaft portion, for rotatably supporting said power roller, wherein the radial clearance of said second radial needle roller bearing is set larger than the radial clearance of said first radial needle roller bearing.

2. A toroidal-type continuously variable transmission as set forth in claim 1, wherein the outside diameters of said support shaft portion and said pivot shaft portion forming said displacement shaft are set in the range of 15–25 mm, the radial clearance of said first radial needle roller bearing is set in the range of 9–31 $\mu$m, and the radial clearance of said second radial needle roller bearing is set in the range of 29–64 $\mu$m.

3. A toroidal-type continuously variable transmission, comprising:

a rotary shaft;

first and second disks rotatably supported on the periphery of said rotary shaft respectively, each of said disks including an inner surface formed as a concave surface having an arc-shaped section, said inner surfaces of said disks being opposed to each other;

a plurality of trunnions respectively swingable about pivot shafts disposed at torsional positions with respect to the center axes of said first and second disks, each of said trunnions including a circular hole formed in the middle portion thereof in a direction perpendicular to the axial direction of said pivot shafts;

a plurality of displacement shafts respectively projecting from the inner surfaces of said trunnions, each of said displacement shafts including a support shaft portion and a pivot shaft portion, which extend in parallel to each other and are offset from each other;

a first radial needle roller bearing disposed inside said circular hole of said trunnion, for rotatably supporting said support shaft portion;

a plurality of power rollers respectively held by and between said first and second disks, each of said power rollers including a peripheral surface formed as a spherically convex surface, the peripheral surfaces of said power rollers being contacted with the inner surfaces of said first and second disks;

a second radial needle roller bearing disposed on the periphery of said pivot shaft portion of said displacement shaft, for rotatably supporting said power roller; and, a plurality of thrust ball bearings respectively interposed between said power rollers and the inner surfaces of said trunnions, for supporting thrust-direction loads applied to said power rollers, wherein the radial clearance of said second radial needle roller bearing is set larger than the radial clearance of said first radial needle roller bearing.

* * * * *